United States Patent [19]
Bantel et al.

[11] Patent Number: 4,509,167
[45] Date of Patent: Apr. 2, 1985

[54] DATA CONFERENCE ARRANGEMENT

[75] Inventors: Richard G. Bantel, West Allenhurst, N.J.; Diane E. Herr, Warrenville, Ill.

[73] Assignees: AT&T Bell Laboratories, Murray Hill; American Bell, Inc., Holmdel, both of N.J.

[21] Appl. No.: 520,690

[22] Filed: Aug. 5, 1983

[51] Int. Cl.³ ............................................. H04Q 11/04
[52] U.S. Cl. ..................................... 370/62; 370/84
[58] Field of Search ................ 370/62, 84; 179/18 BC

[56] References Cited
U.S. PATENT DOCUMENTS
4,475,189 10/1984 Herr et al. ............................. 370/62

Primary Examiner—Douglas W. Olms
Attorney, Agent, or Firm—Charles H. Davis

[57] ABSTRACT

An arrangement for conferencing a plurality of data terminals via a data conference bridge. The bridge includes apparatus for negotiating a common set of communication parameters when data terminals having differing capabilities are connected to the same conference. All terminals connected to an existing conference must agree to accept any differing capabilities of a data terminal about to join the conference or the new terminal will be rejected.

9 Claims, 12 Drawing Figures

MONITOR SEQUENCE

DATA CONFERENCE ARRANGEMENT

TECHNICAL FIELD

This invention relates to communication networks and, particularly, to conference arrangements in a communication network.

In a more particular aspect, this invention relates to arrangements for conferencing data terminals over connections established via a shared network.

In a still more particular aspect, this invention relates to arrangements for conferencing via a shared communication network, data terminals having different features and capabilities.

BACKGROUND OF THE INVENTION

Communication networks have become necessary adjuncts in conducting business on a national and global scale. The existing voice and data networks provide fast and convenient facilities for people and machines to communicate with each other over long distances without the inconvenience of traveling in order to conduct business. These networks, in many instances, are also more reliable and more economical than other forms of communication.

While current networks provide adequate facilities for point-to-point communication, it is desirable to enhance these networks for multi-point operation whereby many customers can participate in conferences to exchange information by voice and other means.

An example of this might be an audio/video conference involving several remotely located business associates, each having a video terminal. In addition to the video terminal, some conferees may have other types of data terminals, such as graphics units, electronic chalk boards, high-speed printers, etc., all of which can be used for communicating information over the network that may be presented at the terminal in different forms. For convenience, these, and other forms of communication, will be referred to herein by the generic term "data" communication; and it is not intended that they be limited only to those forms mentioned above.

The conferencing of data terminals can be achieved through dedicated, or so-called, private line networks. These networks are generally custom-designed so that all terminals are compatible with respect to their features and capabilities. Thus, any terminal in the network can "talk", i.e., exchange data, with all other terminals in the network.

While the above dedicated networks are suitable for their intended purpose, they have certain limitations in that all data terminals must be compatible with respect to features and capabilities. This limitation becomes even more burdensome when the network is shared by many customers, and each customer is allowed full access to all other customers.

SUMMARY OF THE INVENTION

The foregoing problem is solved, and a technical advance is achieved by a data conference arrangement including method and apparatus for negotiating and establishing a common set of terminal capabilities during the establishment of a conference among a plurality of data terminals.

More specifically, the invention is embodied in a multi-port conference bridge for conferencing data terminals by generating calls over a shared communication network to each data terminal. The identities of all terminals to be conferenced are forwarded to the conference bridge, which then establishes a connection to each data terminal conferee via a switched network. When the first data terminal responds, it identifies its capabilities to the data bridge, and these capabilities define the current feature parameters of the conference. As each additional data terminal is summoned, the current parameters of the conference are forwarded to that data terminal. If the data terminal that is being added accepts the bridge parameters, it is added to the conference. If, on the other hand, the data terminal does not have the same capabilities as the conference, the data terminals already established on the conference are polled to see if they will accept the parameters of the terminal that wishes to join the conference.

In accordance with the feature of the invention, all terminals must accept the new parameters, or the data terminal will not be added.

According to another feature of the invention, the conferee in control of the conference is informed that the incompatible data terminal has not been added to the conference.

In accordance with still another feature of the invention, all terminals are notified that the prior capabilities are still in effect when the new terminal is not accepted into the conference.

DETAILED DESCRIPTION

Figure 1:
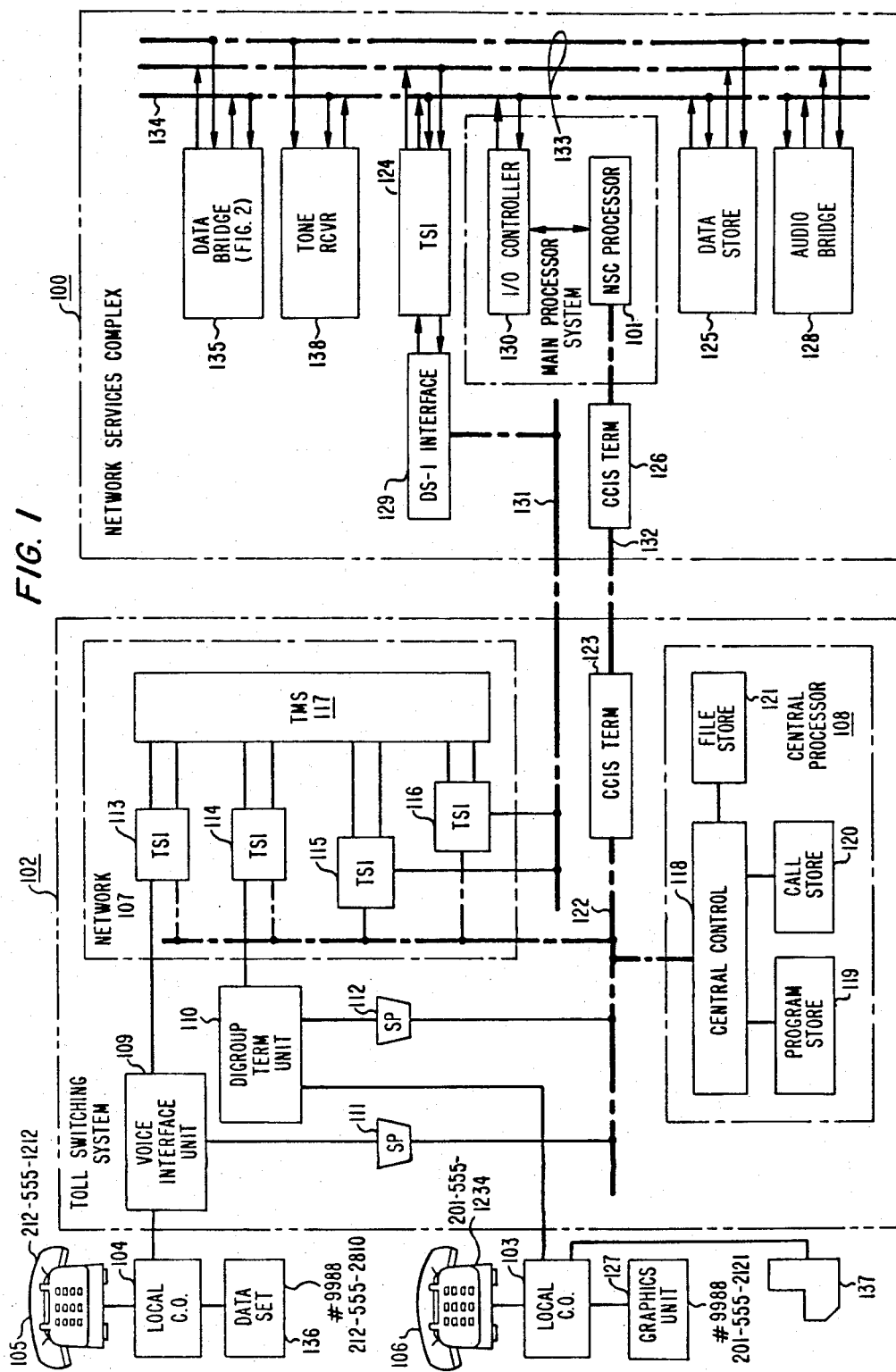
FIG. 1 shows a block diagram of a communication network having a network services complex including a data conference bridge according to the invention.

The general organization of a system employing the invention is illustrated in the block diagram of FIG. 1 which shows a typical communications network having a toll switching system 102 which serves local central offices 103 and 104. Central offices 104 and 103 contain the switching apparatus for providing communication services to customer stations 105 and 106, respectively, and data service to data set 136 and graphics unit 127. Connected to switching system 102 is a network services complex 100 for providing special services such as teleconferencing and data conferencing.

Network services complex 100 includes NSC processor 101, data bridge 135 and other units. As will be described in more detail below, one of the functions of complex 100 is to provide facilities for conferencing data customers over the telephone network via the toll and local switching offices.

Toll switching system 102, as depicted in FIG. 1, is a typical electronic switching system, such as, the No. 4ESS TM electronic switch which is manufactured by the Western Electric Company, Inc. This switching system is described in detail in the *Bell System Technical Journal,* Vol. 56, No. 7, September 1977, and need not be fully described herein for the reader to understand the present invention.

Switching system 102 comprises a network 107, a central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113-116 and time multiplex switch (TMS) unit 117.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 103 is connected to the toll office over the digital facilities which terminate in digroup terminal unit 110, while local office 104 is connected via analog trunks to voice interface unit 109. Digroup terminal 110 performs the multiplexing and demultiplexing between the interoffice facilities and network 107 and also processes signaling information via signal processor 112.

The analog trunks are terminated in a voice interface unit such as 109 whose principal function is analog-to-digital conversion (and vice-versa) plus formatting digital data for the TSI units. Voice interface unit 109 communicates with the central control via signal processor 111.

Signal processor 111 provides the scan, distribute and digit reception tasks for analog trunks, while signal processor 112 performs the equivalent tasks for the digital trunks except that instead of physical scan and distribution points, the supervisory states of each trunk are stored in a memory in a signal processor.

The majority of the logic, control, storage and translation functions required for the operation of the toll switching system are performed by central processor 108. A typical processor suitable for use in the illustrative toll switching system is described in the *Bell System Technical Journal,* Vol. 56, No. 2, February 1977.

Central control 118 is the information processing unit of the system and executes the program instructions resident in program store 119 using the call processing data in call store 120. Central control 118 communicates with the peripheral units via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A typical common channel interoffice signaling system is described in the *Bell System Technical Journal,* Vol. 57, No. 2, dated February 1978, and is represented herein by CCIS blocks 123 and 126 and data link 132. While terminal 126 is referred to as a CCIS terminal, it is not necessary that this terminal be part of the CCIS signaling network used for call processing. Instead, the term CCIS is meant to illustrate the type of terminal suitable for exchanging data with the toll switching system.

Coupled to the toll switching system is the network services complex 100 comprising NSC processor 101, CCIS type terminal 126, DS-1 interface 129, time slot interchange 124, input/output control 130 and data bridge 135. Network services complex 100 can also include other units such as an audio bridge 128, data store 125, tone receiver 138, etc.

It is intended that network services complex 100 function with many different types of switching systems to provide several special services in addition to those mentioned above. As such, complex 100 has been designed to connect to a switching system via conventional interoffice trunks 131 and a data link 132. The interoffice trunks 131 serving complex 100 are digital facilities similar to the trunks between toll office 102 and local office 103 as described above and the data link 132 and its CCIS terminals are similar to those described in the 1978 *Bell System Technical Journal* cited above.

The network services complex is modularly designed to allow for various service units to be added. All units are interconnected over a time-multiplexed data bus (TMDB) 133 and a serial control bus (SCB) 134. The control bus is used by the NSC processor 101 to communicate control, status and error information with the various units in the complex. Data bus 133, which is used for customer data to be conferenced, consists of a transmit bus and a receive bus and each bus is a 256 time slot, time-multiplexed PCM data bus.

Interface 129 connects the T1 lines 131 from toll switching system 102 to time slot interchange unit 124 which switches any time slot in the receive T1 bus or the transmit portion of data bus 133 with any time slot on the T1 transmit bus or the receive portion of data bus 133.

The network services complex 100 is controlled by NSC processor 101 which performs all call processing, maintenance, fault recovery, diagnostics and audits for the entire complex. Processor 101 also interfaces with terminal 126 to transmit and receive messages from the host toll switching system 102.

As mentioned above, the network services complex can be equipped to furnish many services. For this illustrative embodiment, let it be assumed that the complex is equipped with a data conference facility designated by block 135 and the conference facility will be used for establishing data conferences under customer control.

If a customer having data set 136 wishes to establish a conference between his data set and other data sets, the customer places a call using his telephone set 105 and keys in the telephone numbers of all conferees to be added to the data bridge. NSC processor 101 in cooperation with central processor 108 establishes communication paths via time slot interchanger 124 between each conferee data set and the data bridge 135. In general, data bridge 135 receives requests for connecting and disconnecting conferees to and from the bridge in the form of orders from NSC processor 101 over control bus 134. The nature of these orders will not be described herein since a detailed knowledge of this is unnecessary for a full understanding of the present invention.

Figure 2:
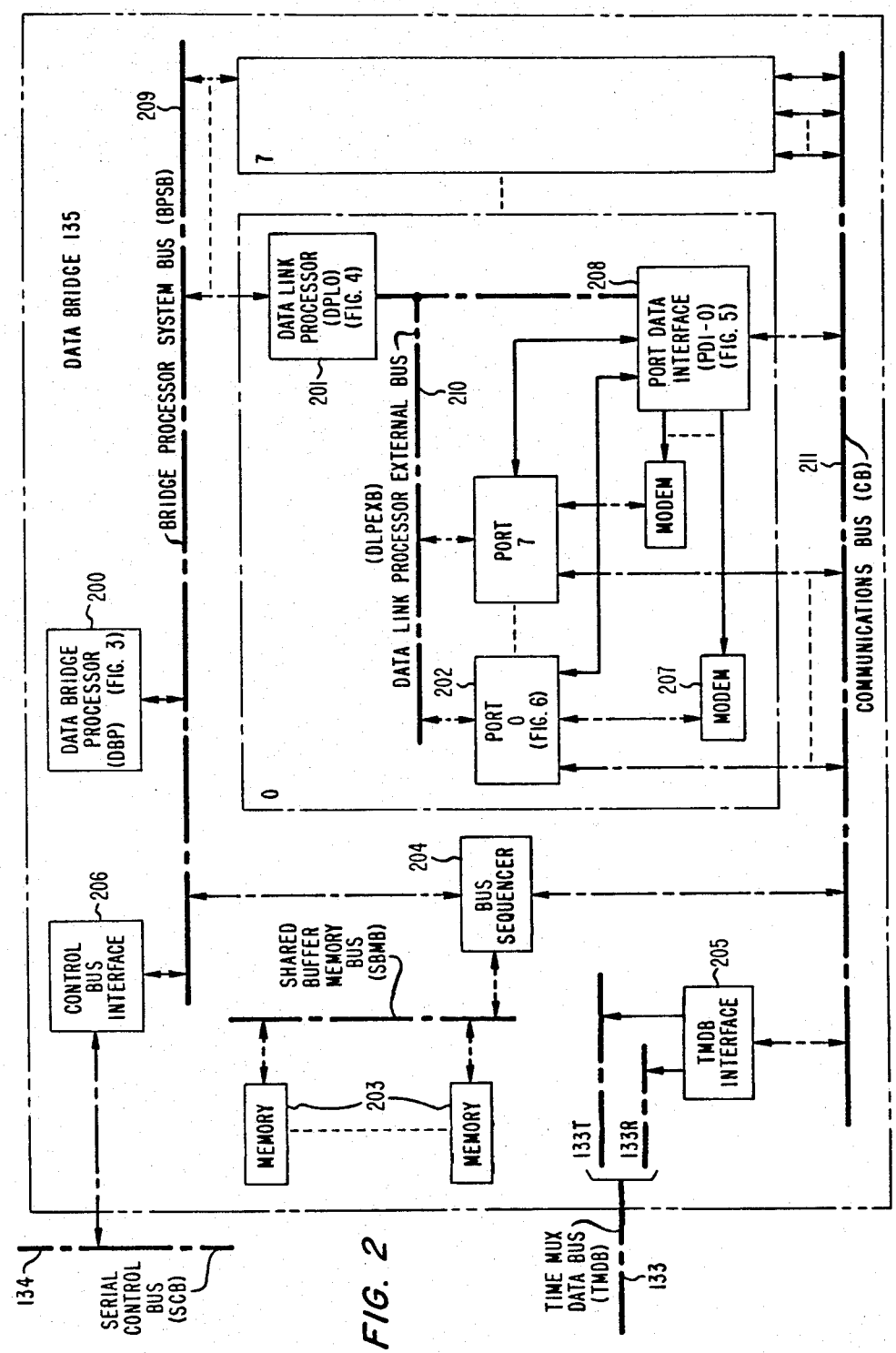
FIG. 2 shows a more detailed block diagram of the data bridge.

The apparatus of the data bridge is more fully disclosed in FIG. 2. As shown in FIG. 2, data bridge 135 comprises data bridge processor 200, a plurality of data link processors such as 201, a shared buffer memory 203 and a bus sequencer 204. Associated with each data link processor is a port data interface, such as 208 and a plurality of ports, such as 202. In this illustrative embodiment, eight data link processors are provided in the data bridge and each data link processor is equipped to serve eight ports for a total of 64 ports per data bridge.

The data bridge interfaces with the network services complex via two buses, namely, the serial control bus 134 which handles the control functions and the time multiplexed data bus 133 which handles the data functions.

Access to the control bus 134 is determined by NSC processor 101 acting as a master unit with units such as data bridge 135 acting as a slave. Each slave has a designated interrupt lead to signal the master when the slave wants to use the bus and the master has a cutoff lead associated with each slave to halt the slave's operation on the bus.

The time multiplexed data bus 133 is a bit parallel, word sequential, bi-directional data bus providing 256 channels at a 64 Kb/sec bit rate. Sixty-four of the channels (i.e., one per data bridge port) are dedicated to the data bridge in this embodiment, and the other channels are used for other slave units, such as, audio bridge 128.

For illustrative purposes, it has been assumed that customers using the data bridge will communicate over the network trunks using at least two different modes of communication. Thus, some customers will use trunks that provide a 4.8 Kb/sec half-duplex connection while other customers will use trunks that provide a full-duplex connection at a 56 Kb/sec data rate.

Each of these modes of data communication will also require different sequences of signals between the customer's data terminals and the data bridge. However, the bridge will appear transparent to the different terminals by virtue of its ability to configure itself to the data speed and signaling of any trunk.

It has also been assumed for purposes of illustration that the data terminals communicate over the network to the data bridge using the Group IV facsimile protocol recommended by the CCITT but not yet standardized. Of course, it will be obvious to those skilled in the art that there are other data speeds and protocols that can be used within the spirit and scope of the invention.

The proposed Group IV protocol is a 7-layer protocol, but not all levels need be utilized by the data bridge. Level 1 provides the mechanical, electrical, functional, and procedural characteristics to establish, maintain and disconnect circuits between data terminals and switching equipment. This level may indicate full-duplex or half-duplex operation, synchronous or asynchronous operation, etc. Level 2 is referred to as the "data link layer" and deals with link initiation, error control, and flow control. Level 3 is referred to as the "network layer" and deals with information necessary to establish and relinquish network connections. It is minimally implemented in this embodiment of the data bridge. It, nevertheless, could be fully implemented within the spirit and scope of the invention.

Level 4, called the "transport layer," will be implemented in such a manner that the data bridge will always originate a "transport connection request", specify octet block size, split large frames from high speed terminals into small frames for slower terminals, etc.

Level 5, on the other hand, is the "session layer" which establishes, administers, and transmits communication between two end point facilities (in this case, the data bridge and each terminal). In other words, the two end point facilities must exchange information as to their capabilities with respect to device types and terminal features, and this will be discussed in more detail below.

Level 6 of the Group IV facsimile protocol is referred to as the "document layer" and defines the data types and document composition, while the level 7 protocol may be defined by the user and will not be discussed herein.

Returning now to FIG. 2 and a description of the apparatus, data bridge processor 200 is the main control processor for the data bridge. It interfaces with NSC processor 101 via serial control bus 134 from which it receives conference configuration information and to which it reports conference status. Data bridge processor 200 is connected to the shared buffer memory 203 via the bridge processor system bus 209 and bus sequencer 204. It is from the shared buffer memory 203 that the data bridge processor 200 obtains session and document protocol data. Data bridge processor 200 can also access the various data link processors via bus 209 to control port configuration and monitor the port status. Furthermore, the overall maintenance functions of the data bridge are performed under the control of the data bridge processor.

Each data link processor interface with eight high-level data link control (HDLC) ports, such as port 202, to control the port configuration as commanded by data bridge processor 200. The data link processors also handle all link-level protocol procedures except synchronization, cyclic redundancy checking and bit insertion.

The ports, such as port 202, handle actual frame transmission and reception of the level 2 protocol. The ports interface with a port data interface, such as 208, from which they receive 56 Kb/sec serial data, and they interface with a modem, such as modem 207, from which they receive 4.8 Kb/sec serial data. The ports can also interface directly with the shared buffer memory on a time-shared basis via communications bus 211 to read out of the memory information to be transmitted over the network to a conferee or write into the memory data received from a conferee as directed by the associated data link processor.

The major modules of the data bridge shown in FIG. 2 have also been shown in more detail in other figures of the drawing. A description of these modules will now be given beginning with a description of port 202 as shown in FIG. 6.

Port 202 receives and transmits high-level data link control (HDLC) frames in serial format at data rates determined by external clocks. In this illustrative embodiment, only two data rates are being considered, namely, 4.8 Kb/sec and 56 Kb/sec. The port also performs all of the data transfer to and from the shared buffer memory 203 for the information portion of the frames, and the port determines when and where to receive and transmit frames by commands received over bus 210 from its associated data link processor. After a command is executed by a port, the port responds to the data link processor to indicate the command has been executed. Communication between the port and its data link processor is via a shared memory embedded in the memory space of the data link processor.

Figure 6:
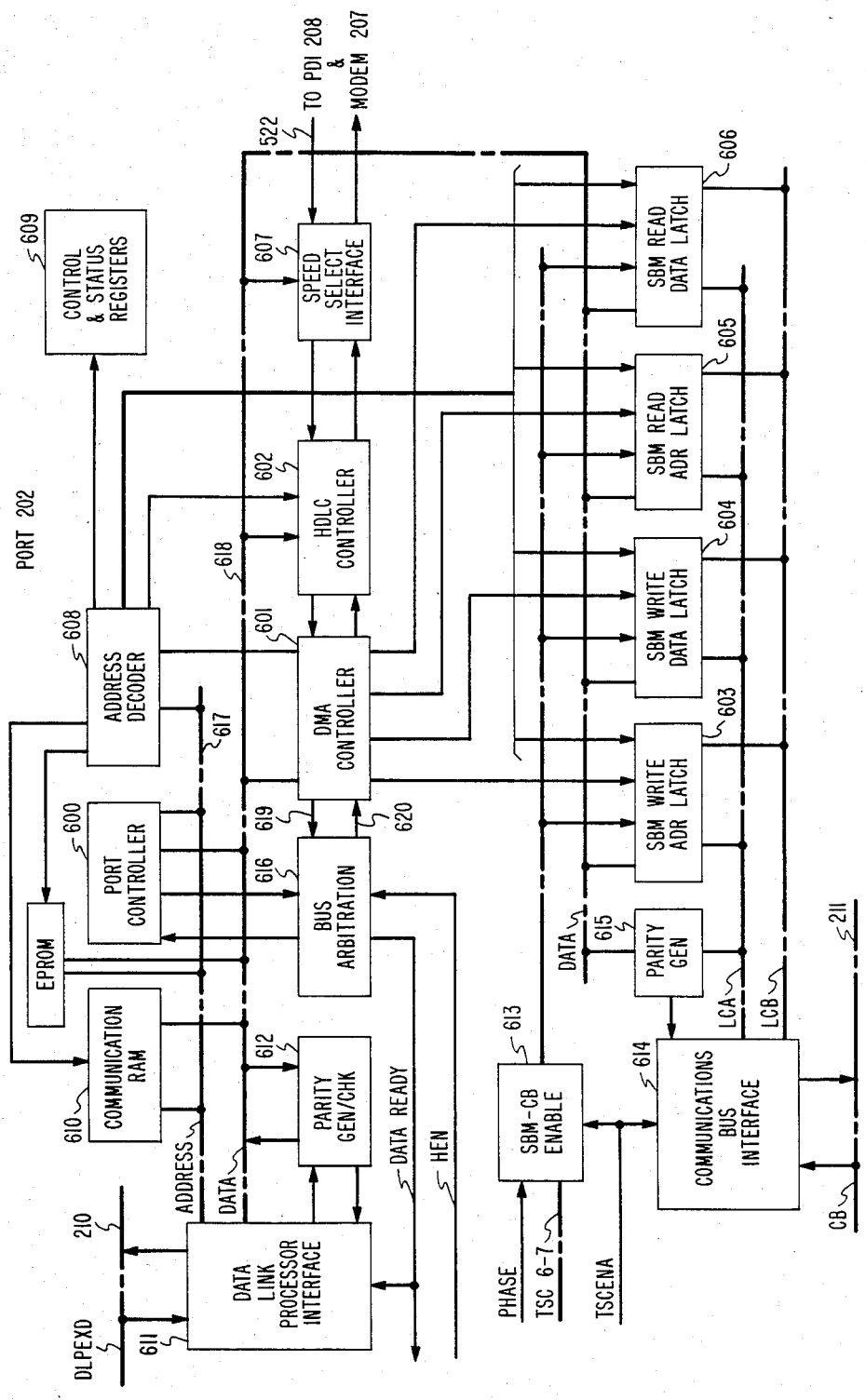

As shown in FIG. 6, the port consists of a port controller 600, direct memory access (DMA) controller 601, high-level data link (HDLC) controller 602, communications RAM 610 and other devices for interfacing with the various bus systems.

The port controller 600 includes a microprocessor, with an associated EPROM for program storage, and provides control of the port by executing commands received over bus 210 from the data link processor. A port can function to transmit a frame and receive a frame of data at the same time. The port has an internal address bus and a data bus 617 and 618, respectively, and these buses are coupled to the data link processor external bus 210 via interface 611. Within the port itself, buses 617 and 618 are directly coupled to RAM 610 and port controller 600 and are coupled via address decoder 608 to the DMA controller 601, HDLC controller 602, and the shared buffer memory address latches and data latches 603-606. The port controller 600 controls the operation of the other above-mentioned devices over buses 617 and 618.

Since the data link processor 201 (FIGS. 2 & 4) can read and write all of the same external addresses that port controller 600 within the port can, and the DMA controller 601 can access the shared buffer memory address latches and data latches 603-606 via buses 617 and 618, a bus arbitration unit 616 is provided. This allows data link processor 201, DMA controller 601, and port controller 600 to share access to the port address bus 617 and port data bus 618 as required.

When DMA controller 601 needs access, it asserts a hold request signal over conductor 619 which causes port controller 600 to stop execution at the beginning of its next cycle. An acknowledge signal is returned over conductor 620, and DMA controller 601 has access to the bus until it removes its request. When data link processor 201 needs access to the bus, it simply addresses the port, and port controller 600 stops at the beginning of the next instruction. If both DMA controller 601 and data link processor 201 request access to the port bus, the device which first requested is given access, and the DMA controller 601 is given preferred access when simultaneous requests are received at the port.

The data link processor 201 sends orders to the port controller via the shared communications RAM 610.

Data from a conferee is received by the port from the port data interface or from a modem, and the port is directed to function at a particular data rate by a signal from the port data interface. If the port is to receive data from a conferee who is transmitting at the 4.8 Kb/sec data rate, the information is sent via a modem (such as modem 207 in FIG. 2) to speed select interface 607. Interface 607 provides the 4.8 Kb/sec data and control information to be used by HDLC controller 602 and port controller 600 firmware. Interface 607 also provides several control signals to the modem.

The HDLC controller 602 provides framing, bit stuffing, cyclic redundancy generating and checking functions, and serial to parallel data conversion between the port 8-bit parallel data bus and the port data interface 208 or modem 207.

The HDLC controller 602 is under control of port controller 600. For example, port controller 600 could write a "receive" command coupled with a "maximum buffer length" into the HDLC controller 602. The HDLC controller would then receive bytes of data and put them in the shared buffer memory via DMA controller 601 and the write latches 603 and 604. Upon completion of the frame, the HDLC controller 602 would notify port controller 600, and controller 600 could read the results.

As mentioned above, the port controls the read/write functions of all conferee data out of and into the shared buffer memory. Access to the shared buffer memory is on a fixed time-slot basis over communications bus 211 via interface 614 and enable circuit 613. Each port is assigned one read and one write cycle every 125 $\mu$sec which provides an effective data rate of 64 Kb/sec that exceeds either of the two different modes of customer communication described above.

The read and write portions of DMA controller 601 handle read and write requests from HDLC controller 602. DMA controller 601 also manages the data and address latches 603-606 and determines when read and write functions are to be done.

The initial address of a frame consists of 24 bits making 16 megabytes of a shared buffer memory accessible to a port. The memory is divided logically into 1 Kbyte blocks and a new address is written for each frame.

To receive a frame, the port controller simply loads the DMA controller 601 with the lower 16 bits of the frame address while the upper 8 bits are loaded into the write address latch 603. The maximum byte length of a frame is loaded into the terminal count of the write portion of DMA controller 601. When a byte becomes available from HDLC controller 602, DMA controller 601 gains access to the port buses and loads the low-order 16 bits into the write address latches. The DMA controller then enables data to come from the HDLC controller to the write data latches 604.

Each port is guaranteed one shared buffer memory read and one write every 125 $\mu$sec and when the appropriate time slot count is decoded, the read or write is done based on the latched read or latched write signal. When the latched write signal has been set, the next time a write time slot for the shared buffer memory occurs, the upper 16 bits of the address are strobed onto communications bus 211 followed by the lower 8 bits of the address and the received data byte. The latched write signal is then cleared automatically. Similar action takes place for reading the shared buffer memory except that data from the shared buffer memory is strobed into the read latch to be transmitted.

The port 202 shown in FIG. 6 also contains control and status registers 609. The control register can be set by the local port controller 600 or by the data link processor 201 and the register is selectively set to cause certain events to occur. For example, a "cut-off" bit can be set in the register by the data link processor to cause the port controller to be removed from service. Also, the port controller can set a "service" bit when it requests action by the data link processor. Setting the service bit causes an interrupt to the data link processor.

The status register contains several bits which can be set by various units in the port to report their status. A bit designated "digital" is set by the port data interface to indicate the data speed that the port is to receive, and the status register contains other status bits which indicate when a write or read to the shared buffer memory has occurred.

The port data interface 208 is shown in more detail in FIG. 5 and now will be described. In this illustrative embodiment, the port data interface functions with eight port units, such as port 202, which is shown in FIG. 6. The port data interface performs the function of interfacing the ports and the time multiplexed data bus for the different modes of transmission utilized by conferees. As mentioned above, for purposes of illustration, the conferees can communicate over the network channels using 4.8 or 56 Kb/sec data rates. Port data interface 208 receives data from and transmits data to the network services complex time-slot interchange 124 (FIG. 1) via the time multiplexed data bus 133 and communication bus 211 at a 64 Kb/sec rate compatible with the standard T1 trunks at the toll switching center 102. Thus, each 8-bit byte of data at the T1 data rate on communication bus 211 may represent either a 4.8 Kb/sec conferee channel or a 56 Kb/sec conferee channel.

For the 56 Kb/sec conferee, the port data interface strips off one signaling bit and converts the remaining 7-bits of data from its parallel format on communication bus 211 into a serial format which it transmits directly over conductor 522 to the speed select interface unit in port 202.

For a conferee transmitting at a 4.8 Kb/sec rate over the network, the 8-bit data byte is converted to serial and transmitted to CODEC 520. CODEC 520 converts the serial PCM information to analog and transmits the analog signal to modem 207 (shown in FIG. 2). Modem 207 converts the analog signal back into a digital format, and this data stream is transmitted to the speed select interface in port 202. Then, as mentioned above, the port can store the data in the shared buffer memory using the communication bus 211.

Thus, the data stored in the shared buffer memory after being processed by the port data interface and the port is in the same format for all conferees regardless of the data rate that the conferee terminals were using. This data can then be extracted from the shared buffer memory by any port for transmittal to any conferee at the data rate compatible with that conferee.

Figure 5:
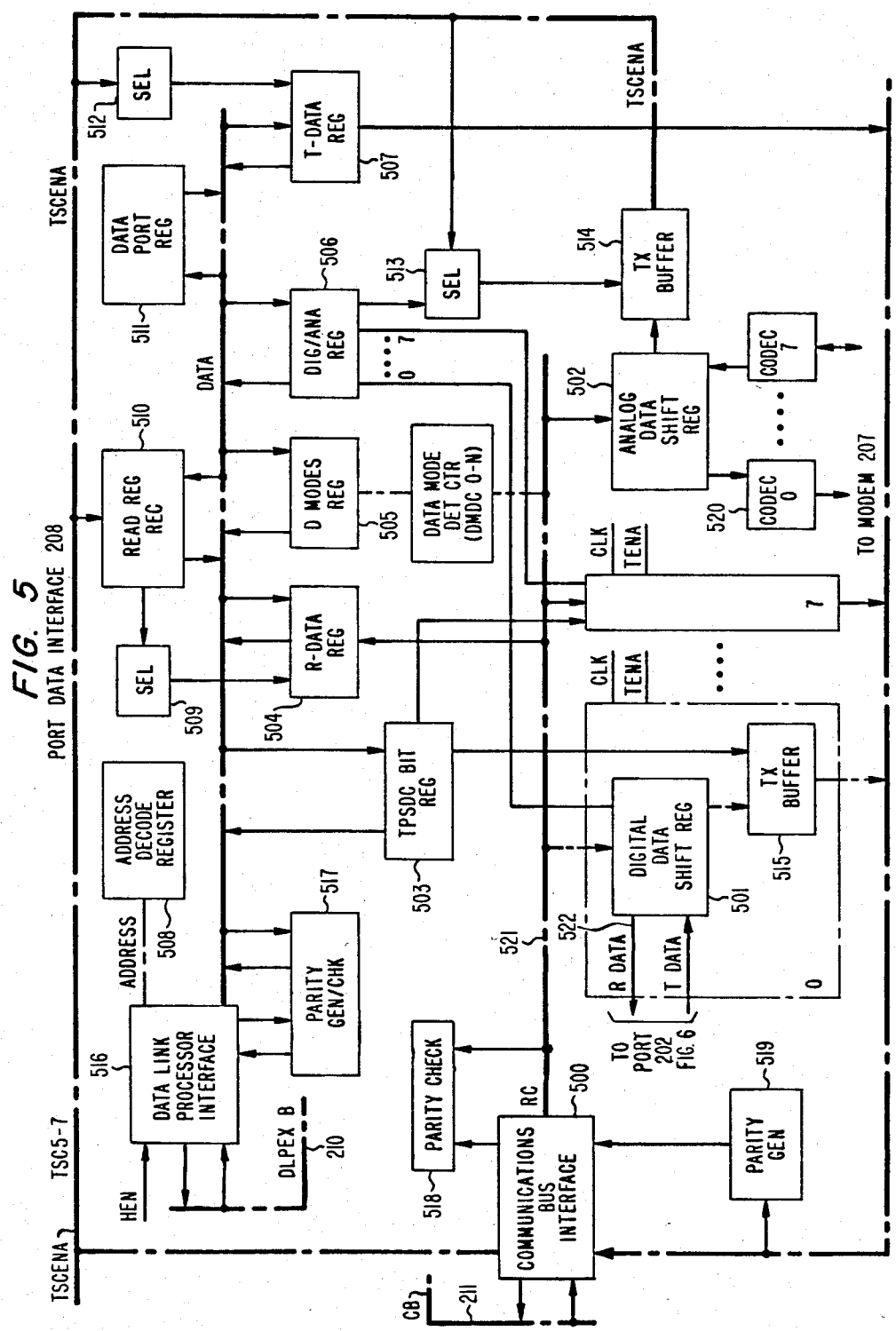
FIG. 5 depicts the port data interface which interfaces a data link processor with a plurality of ports, such as the port shown in FIG. 6.

The port data interface 208, as shown in FIG. 5, has seven control registers which can be accessed directly by the data link processor over bus 210, and these registers control the selection of data speed conversion and the transmission of an idle code on an idle channel as dictated by the data link processor 201.

Receive data register 504 and transmit data register 507 are 8-bit registers that are used for writing and reading, respectively, data to and from the time multiplexed data bus via communication bus 211.

The other registers are formatted so that each register contains a bit for each port and each register corresponds to a function for the ports as follows: register DIG/ANA 506 contains a bit per port which determines the bit rate to be transmitted and received by the port, register DATAPORT 511 contains a bit per port which enables or disables the serial data to be sent or received to or from a port, register DMODES 505 is a read-only register which contains a bit per port that indicates whether or not the 56 Kb/sec channel is receiving a data mode indication from the far-end terminal, the register TPSDC BIT 503 also contains one bit for each port and specifies that the eighth bit of each byte of the 56 Kb/sec data stream should be transmitted over the time multiplexed data bus, and register REA-DREG 510 contains one bit per port; and, when the bit is set, the contents of the time multiplexed data bus for that port is read into receive data register 504.

The operation of the port data interface can best be understood by describing how the port data interface handles data when the conferee is utilizing 56 Kb/sec data terminal, and the data must be transmitted between a port and the time multiplexed data bus which handles data at 64 Kb/sec.

Let it be assumed that the data link processor has transmitted an order to the port data interface to set the DIG/ANA register 506 to indicate that port 202 should be in the 56 Kb/sec data speed mode. Eight-bit parallel data received from the time multiplexed data bus via communication bus 211 is checked for parity by parity check circuit 518 and shifted into a digital data shift register such as 501 which corresponds to port 202. The signaling bit which indicates whether the far-end terminal is in the control or data mode is stripped off the incoming signal and the remaining seven bits are shifted out serially via conductor 522 to the port. At the proper time, port 202 can enter the data in shared buffer memory 203. At the same time, serial data from the port which was read out of memory 203 is shifted into register 501, and after seven bits have been collected, a signaling bit is appended thereto and eight bits are loaded into transmission buffer 515. At the proper time-slot count, buffer 515 is unloaded to transmit the data over communications bus 211 and the time multiplexed data bus and via the time-slot interchange 124 to the far-end terminal.

The signaling bit indicates the mode of the channel. More specifically, in the voice mode the bit will change from 0 to 1 and vice versa, while in the digital data mode, the bit is a contiguous stream of ones and a contiguous stream of zeros are sent out to indicate the digital control mode.

The received signaling bits are counted to determine whether the channel is in the data or control mode and any change in the mode causes an interrupt signal to be sent to the data link processor.

The bits in each of the registers 506 and 511 when taken together, specify the state of each port. Thus, a 0 or 1 in the DIG/ANA register 506 indicates the channel is in the 56 Kb/sec or 4.8 Kb/sec mode, respectively. Furthermore, if the port is in the 56 Kb/sec mode, then the 0 or 1 in the DATAPORT register 511 indicates the control or data mode of the channel, respectively. In the control mode, whatever has been loaded in the transmit data register 507 is sent over the time multiplexed data bus, while in the data mode, serial data from the port is sent out.

The port data interface under control of the data link processor will go through three general sequences for setting up and taking down a leg to a data conferee. A monitor sequence is executed to determine whether or not the far-end (i.e., conferee) terminal is in the control mode. In this sequence, the conference originator's voice path is connected to both the transmitting and receiving paths of the far-end terminal via the time-slot interchange unit of the network services complex. The port data interface is connected only to the receiving path from the terminal through the same time-slot interchange unit, and since the far-end terminal is in the voice receiving mode, it will either be in the control or voice mode but not the data mode.

The monitor sequence is initiated when the data link processor sets up the port data interface to read data from the time multiplexed data bus. This is accomplished by setting the bit for port 202 in register 506, conditioning the port data interface to receive data at the 56 Kb/sec data rate. The data port (DATAPORT) register 511 is also set for this port to disable serial data from the port and to cause the output of transmit data register 507 to be transmitted over the time multiplexed data bus.

The contents of the receive portion of the time multiplexed data bus are then read into receive data register 504, and a software counter is set up to count the number of time slots that the "control mode idle" code is received. Every 125 μs a new byte is available in register 504. If the control mode idle character is not found, it means that the far-end terminal is not in the digital control mode.

Figure 7:
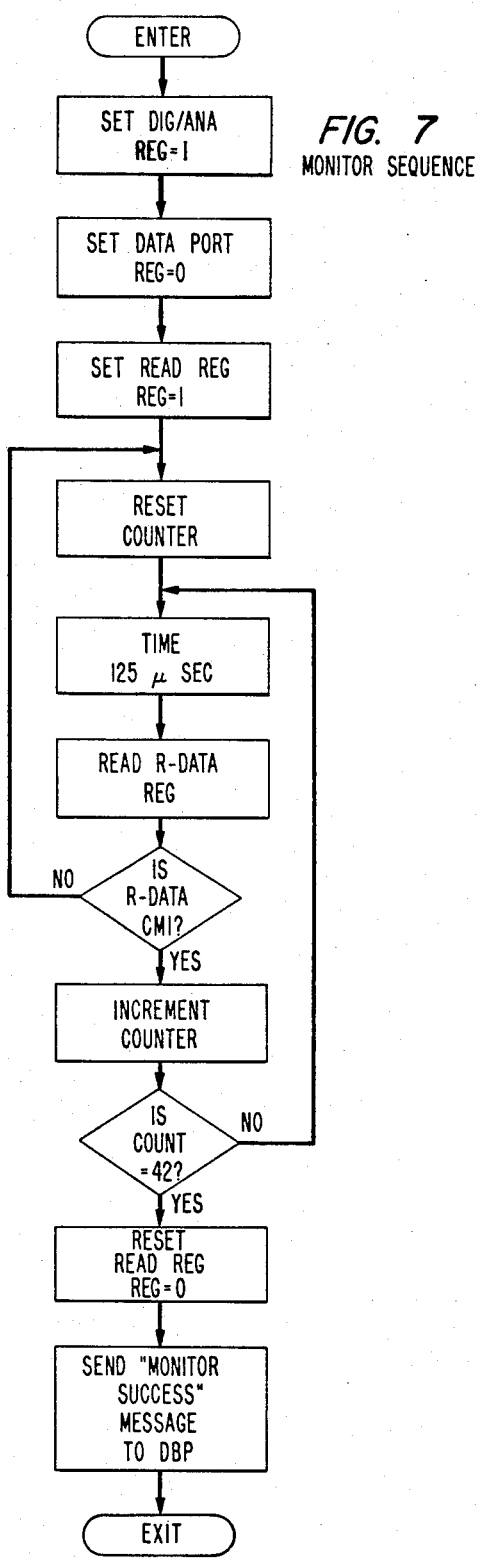
FIG. 7 shows the flow diagram describing the sequence of operations for monitoring a conference leg (i.e., port)

Each time a control mode idle character is detected, the counter is incremented and eight consecutive bytes must be received before the data bridge determines that the far-end terminal is in the control mode. Upon detecting that the port is in the control mode, a "monitor success" response is reported by the data link processor to the data bridge processor. A flow chart of this sequence of events is shown in FIG. 7.

Figure 8:
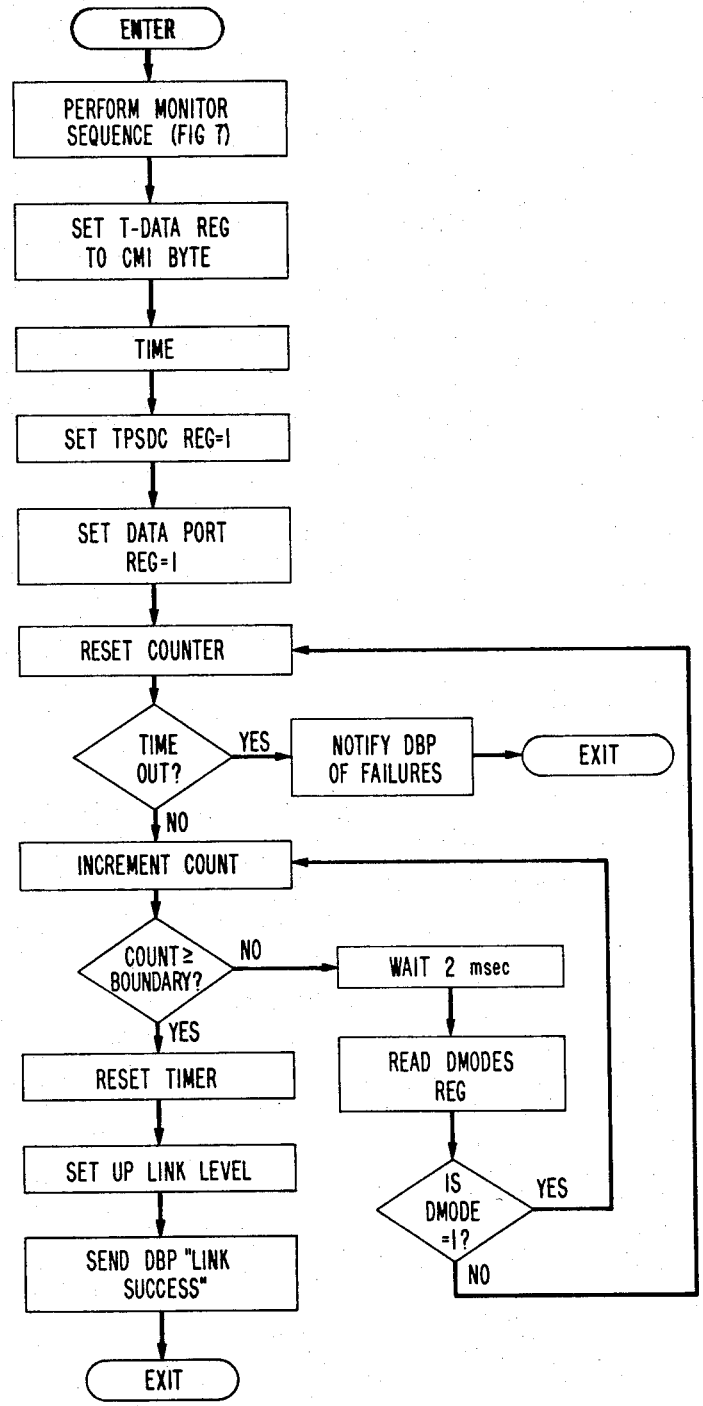
FIG. 8 shows the flow diagram describing the sequence of operations for connecting a leg to a conference.

The connect sequence of events describes the data link processor and port data interface operation in setting up a port so that it can be added to a conference. This sequence is shown in the flow diagram of FIG. 8 and begins by executing the monitor sequence described above. The data link processor also sets the transmit data register 507 to the control mode idle byte, and the control mode idle character is transmitted to the far-end terminal eight times.

The data link processor then sets the bit in register 503 associated with port 202 causing the digital data mode character to be transmitted. Also, the bit in DATAPORT register 511 is set to enable the port to transmit and receive serial data.

A software counter is then set up to time the interval it takes for the far-end terminal to switch to the data mode, since after the bit in register 511 is set, the incoming signaling bit should eventually change to a series of ones indicating that the far-end terminal has switched to the data mode.

If a time-out occurs before the far-end terminal change mode, a link failure message is sent by the data link processor to the data bridge processor, and the connect attempt is aborted.

If a change of mode is detected, the counter is incremented and a count of 48 consecutive ones of the signaling bits must be detected to signify a change to the data mode. When a change to the data mode is detected, a link success message is sent by the data link processor to the data bridge processor.

A disconnect sequence is entered into by the data link processor to terminate transmission on the channel. The sequence is initiated by an order from the data bridge processor to the data link processor while the channel is being monitored for the control mode or while the channel is being set up or is operational on a data conference call.

When the data link processor receives the command, it resets the READREG register 510, DATAPORT register 511, and the DIG/ANA register 506 and upon completion, notifies the data bridge processor that the link has been successfully disconnected.

As mentioned above, eight data link processors are provided in this embodiment of the invention to interface the ports with the data bridge processor. The basic function of the data link processor is to control the configuration of its eight ports as directed by commands for the data bridge processor and also to handle all link level protocol procedures except synchronization, cyclic redundancy checking and bit insertion. Furthermore, the data link processor reports back to the data bridge processor when specific tasks have been executed.

Figure 4:
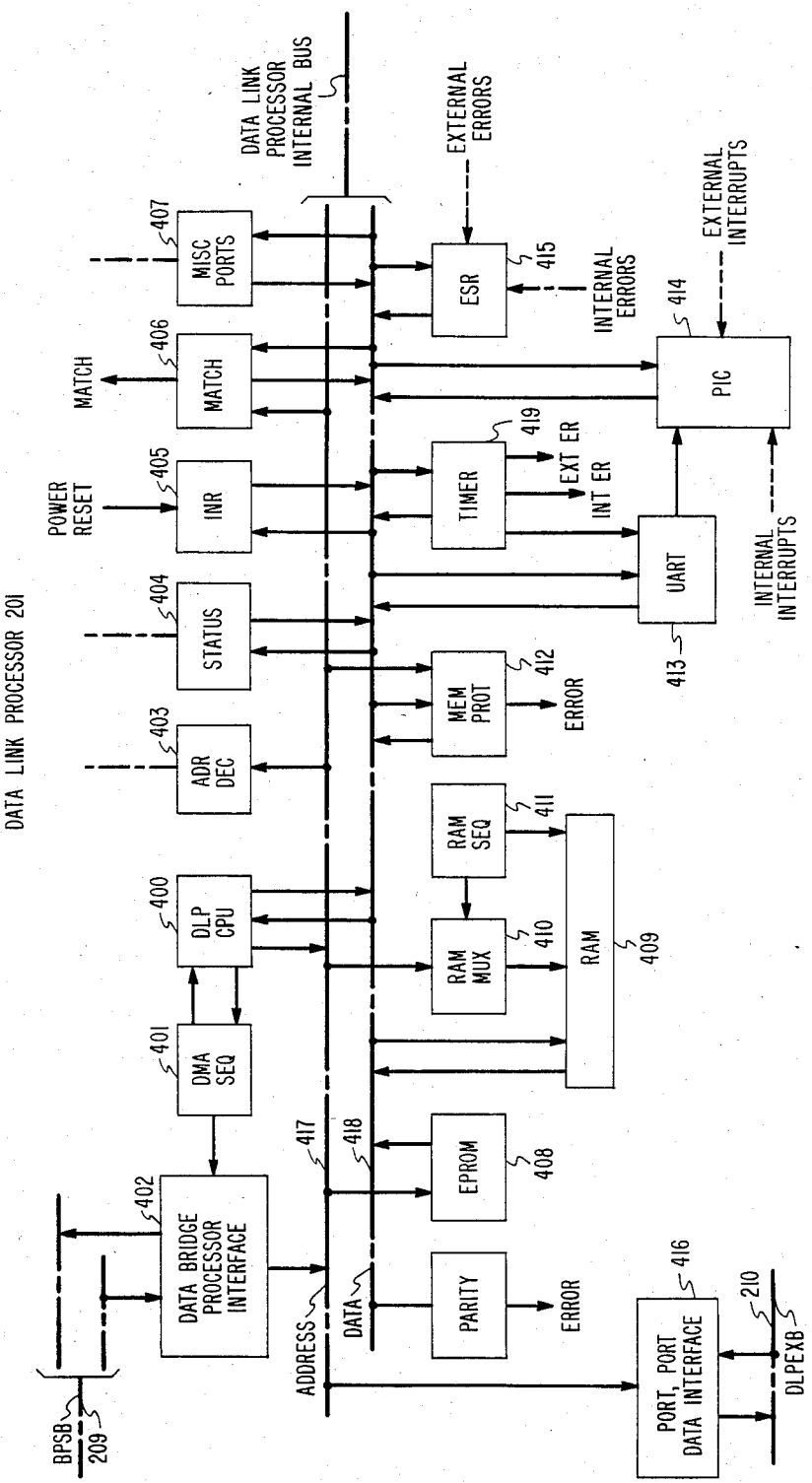
FIG. 4 shows a block diagram of a typical data link processor.

The data link processor is an 8-bit microprocessor based system and as shown in FIG. 4 comprises a read-only memory 408, a RAM 409, a priority interrupt controller 414, a programmable timer 419, and various other units. The data link processor interfaces with the data bridge processor via the bridge processor system bus 209 and interface 402. Likewise, access to the port data interface and the ports is via the data link processor external bus 210.

The central processing unit 402 is an 8-bit central processing unit which is interconnected with the other units of the data link processor via an 8-bit data bus 418 and a 16-bit address bus 417.

The data bridge processor (FIGS. 2 and 3) addresses one of the data link processors over the bus 209 and interface 402. Once data link processor 201 is selected, the central processor 400 relinquishes control of address bus 417 to permit the data bridge processor to select data within the data link processor.

Priority interrupt controller 414 allows for several levels of priority interrupt caused by units within the data link processor and external units in its corresponding port data interface and the eight ports associated therewith.

When an interrupt is received by controller 414, it transmits an interrupt request to processor 400. Processor 400 ascertains the nature of the interrupt and jumps to the first instruction of the interrupt service routine to be performed.

Error source register 415 provides the means for processor 400 to recognize errors occurring within the data link processor or externally. Internal errors can occur as a result of a parity failure detection on one of the buses, time-outs, RAM failure, etc. Hardware failure in the port data interface or ports are considered external error failures insofar as the data link processor is concerned, and these are detected by register 415.

The status register 404 is provided to indicate the status of several hardware units within the data link processor or under its control. Also, certain bits in the status register can be set by the data bridge processor to cause the data link processor to interrupt the data bridge processor or to be reset.

The data link processor shown in FIG. 4 also includes an interface 416 which permits the data link processor to interface with the ports and the port data interface. Certain of the leads of address bus 417 are extended via the interface to the ports and to the port data interface along with the data bus 418. The output of address decoder 403 selects the port data interface or one of the ports. When a port is selected, the data link processor must wait for the port to complete its current memory cycle before the data link processor can use the port bus. The port controller then relinquishes the bus to the data link processor allowing the data link processor to complete its operation within a fixed time interval.

Figure 3:
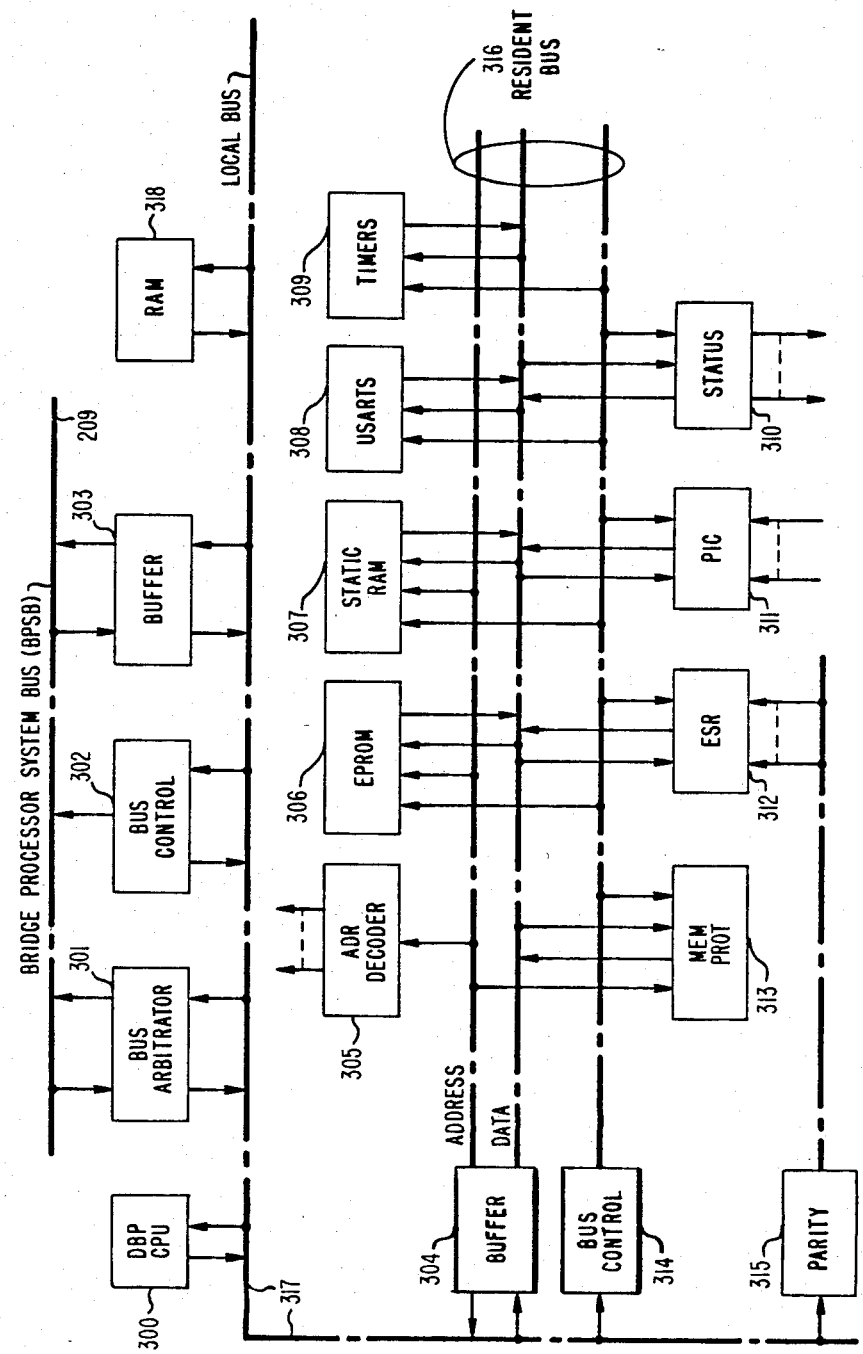
FIG. 3 shows a block diagram of the data bridge processor.

The data bridge processor is the main control processor of the data bridge system and is shown in FIG. 3. In this embodiment, the data bridge processor comprises a 16-bit central processing unit 300, memories 306, 307 and 318, priority interrupt controller 312 and other miscellaneous circuits.

Central processing unit 300 utilizes two resident memories, namely, RAM 307 and EPROM 306 and accesses these memories via a resident bus 316. For program storage and for scratch pad memories, the data bridge central processing unit 300 utilizes dynamic RAM 318 which is accessible over local bus 317.

The data bridge processor has access to the bridge processor system bus 209 via bus arbitrator 301, bus control 302, and buffer 303, and it is over this bus that the data bridge processor can access the shared buffer memory 203 and any of the eight data link processor memories previously described. Furthermore, it is over bus 209 that the data bridge processor can communicate with the network services complex processor 101.

Priority interrupt controller 312 provides prioritized interrupts from the units within the data bridge processor and also from external units such as the eight data link processors. The controller 312 automatically resolves the priority among the simultaneous interrupts according to a preassigned schedule.

The shared buffer memory 203 as shown in FIG. 2 is used to temporarily store the data that is passed among the ports and the data bridge processor during a conference. In this embodiment of the invention, the memory is made up of six modules of dynamic RAM wherein each module contains up to 512 kilobytes of memory.

The memory is accessible via communication bus 211 for the ports and via the bridge processor system bus 209 for the data bridge processor and the eight data link processors. Bus sequencer 204 provides the timing, memory refresh and access allocation for these buses.

The 125 μs frame interval is divided into 64 subframes, each corresponding to a port of the data bridge. Every sub-frame is further divided into two port access cycles and one data bridge processor access cycle. During a port access cycle, the shared buffer memory bus 212 is connected to communication bus 211, and the port that has been selected by the time-slot count can drive these buses to read from or write data into the shared buffer memory. The data bridge processor accesses the shared buffer memory during its portion of the subframe cycle with the exception of one cycle out of eight which is used for refreshing the memory.

As mentioned above, the data bridge 135 responds to orders from NSC processor 101 for adding and disconnecting legs (i.e., ports or channels) for each conference.

Figure 9:
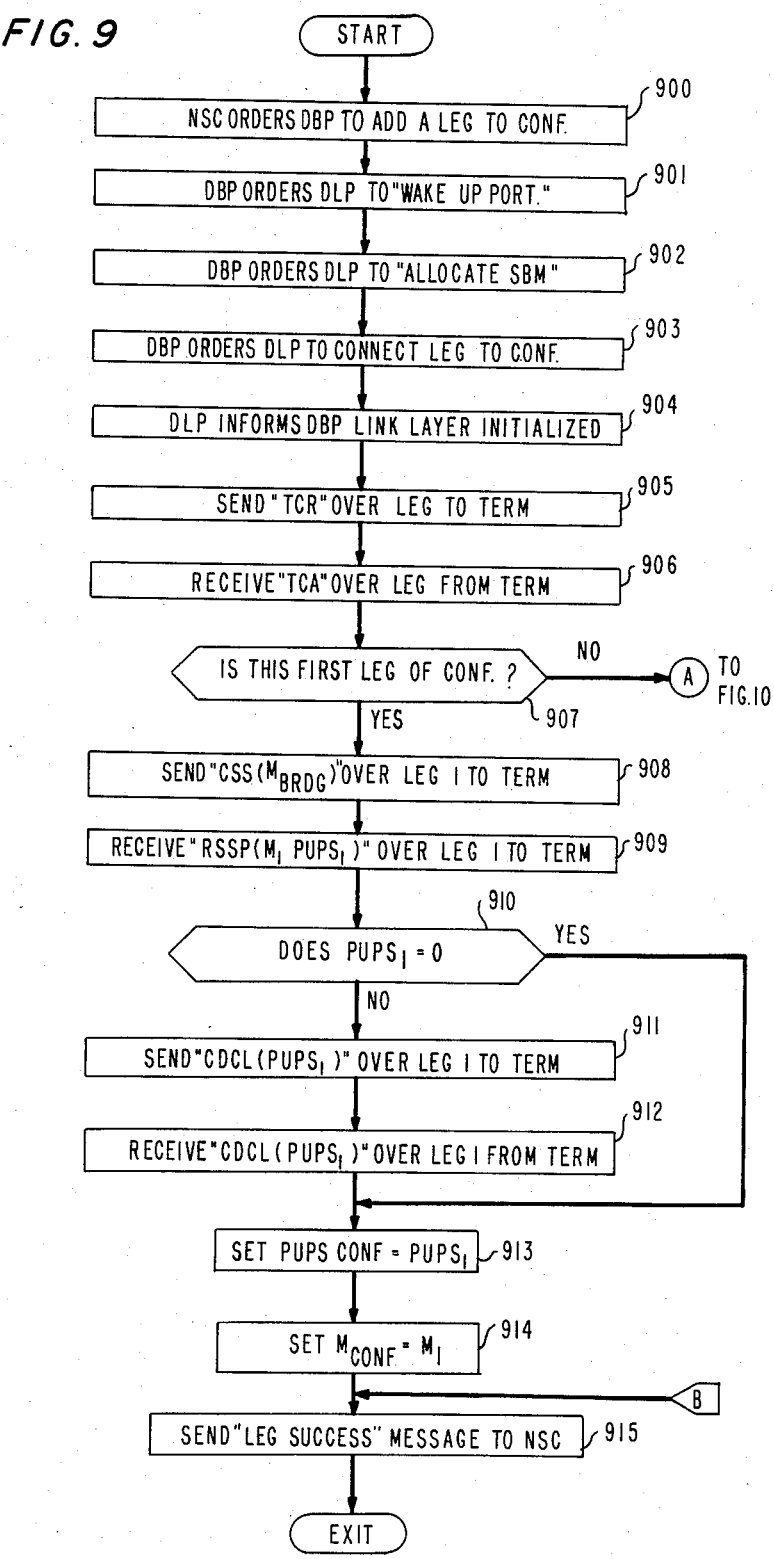
FIG. 9-11 shows a general flow diagram of the sequence of operations for ordering the connection of a leg to a conference.
Figure 10:
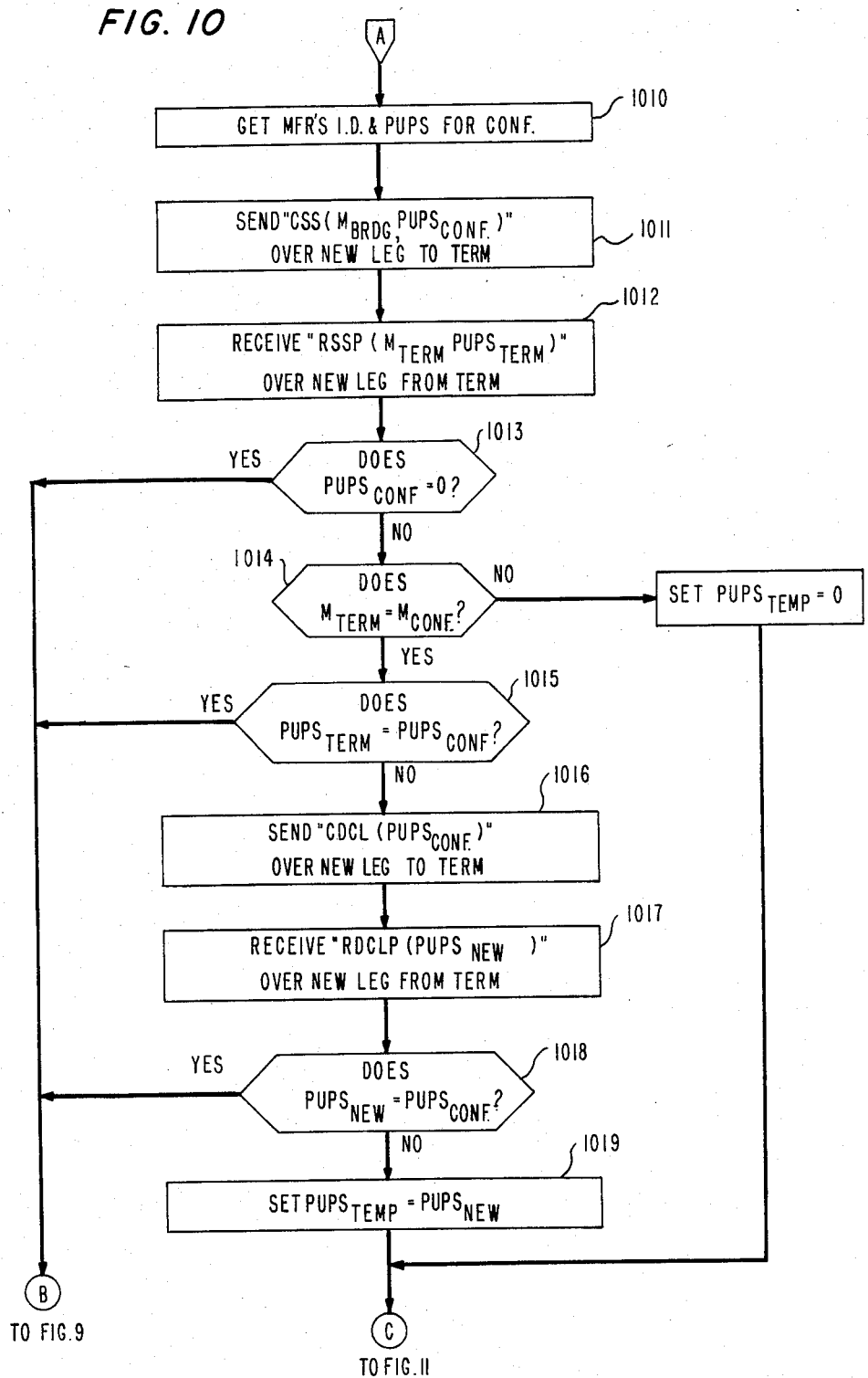

A description will now be given, with respect to FIGS. 9-11, of the sequence of operations for adding data legs to a conference and establishing a common set of parameters for the data terminals for exchanging conferencing data via the data bridge system.

A conference is established under the direction of a conference originator who dials the directory numbers associated with the data terminal of each conferee. Upon receiving a request for setting up a data conference, processor 101 examines its memory to ascertain if sufficient resources are available for the conference and reserves a sufficient number of data ports for the conference. The toll switching system 102, at the request of processor 101, then establishes communication paths to each data terminal.

As idle T1 trunks in link 131 are selected for connection over the network to a conferee data terminal, NSC processor 101 couples these trunks via TSI 124 to the time slot assigned to one of the reserved ports. Concurrently, NSC processor 101 sends an "add a leg" command, as shown in box 900, over control bus 134 to data bridge processor 200. This command would identify the conference number, the port number, and the data speed of the terminal to be served by the port.

In response to the "add a leg" command, the data bridge processor sends port "wake-up", "allocate" and "connect" orders (boxes 901-903) to the data link processor for the selected port. The "wake-up" order causes the data link processor to begin scanning the buffers for further orders from the data bridge processor and the "allocate" order allocates the beginning and end addresses in the shared buffer memory 203 to be used by the port for storing received data. The "connect" order is sent to begin leg set up and defines the data speed of the port. The data speed denotes the clock speed, whether the terminal will operate in a full or half-duplex mode, etc.

In response to the "connect" order from the data bridge processor, data link processor 201 initializes the port through the link layer (level 2) of the protocol. The data link processor communicates with the port controller 600 via a shared memory as described above. The command from the data link processor to initialize the port causes the port to be put in a full or half duplex mode and prepares the port for receiving the first frame of data via the time multiplexed data bus.

When the port is initialized, it transmits a response back to the data link processor indicating that it is configured for the transfer of data. The data link processor also responds to the data bridge processor, thereby, informing the data bridge processor that the link layer has been initiated as set forth in box 904.

In response to the acknowledgement that the data link processor has initialized a port through the link layer protocol, the data bridge processor 200 sends a transmit command to the data link processor to have port 200 transmit a "transport connection request" (TCR) command to the remote data set served by the port (box 905). Since the data bridge will always act as a calling data station, the TCR command is sent from the data bridge to initiate a transport connection, and it contains information about the protocol class and any optional functions. In the example being described, the data bridge will indicate among other things that two data block sizes are available, one for the full duplex 56 Kb/sec data speed, and one for the half duplex 4.8 Kb/sec data speed mentioned above.

Command messages are sent over the conference legs to the remote data station by the data bridge processor 200 loading the command in the shared buffer memory and then ordering the data link processor to have the port associated with that leg, transmit the information stored in the memory. Likewise, reply messages from a terminal and received by a port are stored in the shared buffer memory by the port. The port then reports to the data link processor that a message has been received and informs the data link processor of the memory address used to store the data.

Upon receiving the TCR message, the remote data station will respond to the port circuit of the bridge with a "transport connection accept" (TCA) message indicating its acceptance of the transport connection. The TCA block of data includes the transport parameters applied to the connection which will be the ones used by the data bridge system.

The data bridge port upon receiving the TCA message, puts it in the shared buffer memory and reports to the data link processor that a message has been received. The data link processor examines the message and verifies that it is a valid TCA message, and reports back to the data bridge processor that a "transport connection accept" message has been received as shown in box 906.

Upon determining that this is the first leg of the conference, data bridge processor 200 executes the "yes" branch of box 907 and sends an order to the data link processor to have a "command session start" (CSS) message sent out to the remote data terminal served by port 202 as shown in box 908.

The CSS message is a command used to establish the session level of communication. Among the information transmitted in the CCS message is the service identifier, the terminal identifier (in this case, the data bridge system 135), time and date. Also sent will be certain non-basic terminal capabilities such as page size, image coding capability, resolution, etc., and non-basic session capabilities such as window size and manufacturer's code which is used to identify the manufacturer of the bridge. In the case of a manufacturer's code, the country of manufacture and apparatus type will be sent.

The CSS command also includes a data field indicating the private use parameters of the calling terminal. In the case of the data bridge, which is in effect transparent to data flow among the conferees, the bridge indicates to the first leg summoned to a conference that it is capable of accepting all private use parameters.

Private use parameters are used to define certain capabilities of a data terminal. For example, private use parameters might indicate a terminal has the ability for encryption or to encode/decode image data via a non-standard algorithm.

Upon receiving the CSS message, the remote data terminal served by the port responds with an acknowledgment message called "response session start positive" (RSSP) which indicates that the terminal agrees to establish the session with the bridge.

As part of the RSSP message, the terminal sends its own manufacturer's identification ($M_1$) and all of its private use parameters ($PUPS_1$) as shown in box 909. Port 202 receives the RSSP message from the terminal and stores the information in shared buffer memory 203. Port 202 informs the data link processor which, in turn, informs the data bridge processor that an RSSP message has been received and stored in the memory.

Since this leg is the first leg being established on the conference, the conference will assume the manufacturer's identity and private use parameters of this leg. Accordingly, the data bridge processor 200 causes a "command document capability list" (CDCL) command to be sent to the terminal over this leg (box 911) indicating that the private use parameters to be used for the conference are the private use parameters of the first leg, namely, $PUPS_1$.

The terminal responds with a positive indication by returning a "response document capability list positive" (RDCLP) message to the data bridge along with the private use parameters, $PUPS_1$, now being used for the conference. The data bridge processor 200 now enters in the memory associated with the conference the private use parameters to be used on the conference (box 913) and the manufacturer's identity of the conference (box 914).

If the private use parameters returned from the first leg indicated that the terminal served by that leg had no special capabilities, then the "yes" branch of box 910 would have been executed since there would be no need to exchange the document capability list messages as shown in boxes 911 and 912.

Having successively determined the capabilities of the first leg, and set the conference record to indicate these capabilities, the data bridge processor sends a "leg success" message to NSC processor 101 and this portion of the program is now exited.

In respnse to the "leg success" message, the NSC processor can cause an announcement prompt or tone played to the conference originator to indicate that this data leg has been established, and the originator can then proceed with adding other legs to the conference.

Let it now be assumed that the conference originator wishes to add other data legs to the conference. The sequence of events for adding additional legs is similar to the sequence that was previously described with respect to boxes 900–906 in FIG. 9. When the data bridge processor 200 now executes box 907, however, the "no" branch is executed indicating that this is not the first leg of a conference.

The data bridge processor then executes the process described in box 1010 (FIG. 10) to recover from its memory the manufacturer's identity and private use parameter indication for the conference, and orders a CSS message to be transmitted over the new leg.

The CSS message would indicate the manufacturer's identity of the bridge ($M_{brdg}$) and the private use parameters of the conference ($PUPS_{conf}$).

If the new leg agrees to engage in the session, it returns a "response session start positive" (RSSP) with an indication of its own manufacturer's identification and all of its own private use parameters ($M_{term}$, $PUPS_{term}$) as shown in box 1012.

Data bridge processor 200 now examines the private use parameters previously established for the other legs on the conference. If the conference has no private use parameters as indicated by the execution of the "yes" branch of box 1013, the conference will operate in the basic Group IV protocol and a "leg success" message will be sent to the network services complex processor 101.

Let it be assumed that the conference has a set of private use parameters that were established when leg 1 was connected to the conference as described above. Data bridge processor 200 now executes box 1014 to ascertain if the manufacturer's code of the terminal served by the new leg ($M_{term}$) is the same as the manufacturer's code already established for the conference ($M_{conf}$).

Since the private use parameters are designated by the customer or the terminal manufacturer, the data bridge system must be assured that the manufacturer codes of the terminals to be conferenced are the same or the private use parameter indication is meaningless. In other words, identical private use parameter indications received from different terminals may indicate different terminal capabilities if the terminals were supplied by different manufacturers.

Let it be assumed that the manufacturer's identity of the thermal served by the new leg which is about to be added to the conference is identical with the identity established for the conference, and the "yes" branch of box 1014 is executed. Data bridge processor 200 now compares the private use parameters received from the terminal with the private use parameters established for the conference. If the private use parameters received over the new leg from the remote terminal are the same as the private use parameters already established for the bridge, the "yes" branch of box 1015 is executed and a "leg success" message is sent to NSC processor 101. If, however, the private use parameters for the terminal to be added are different from the established private use parameters for the conference, box 1016 is executed to transmit a "command document capability list" message to the terminal along with the private use parameters of the conference.

Upon receipt of the CDCL message with the private use parameters of the conference, the remote terminal must determine whether it can accept the private use parameters of the conference, or if it does not have the capabilities of the conference, what lesser set of special capabilities the terminal is willing to work with. For the purpose of this description, let it be assumed that the terminal for the new leg does not have all of the capabilities that were previously established for the conference, and the terminal returns a "response document capability list positive" message with a lesser set of capabilities designated herein as, $PUPS_{new}$, as shown in box 1017.

Data bridge processor 200 now executes box 1018 and determines that the capability response received from the new leg differs from the capabilities of the conference, and temporarily establishes a new set of conference private use parameters designated herein as ($PUPS_{temp}$) as shown in box 1019.

In accordance with a feature of the invention, since the new terminal has indicated a set of capabilities differing from the conference, the data bridge system must now poll the terminals already connected to the data conference to ascertain whether or not these terminals will accept the new parameters.

Figure 11:
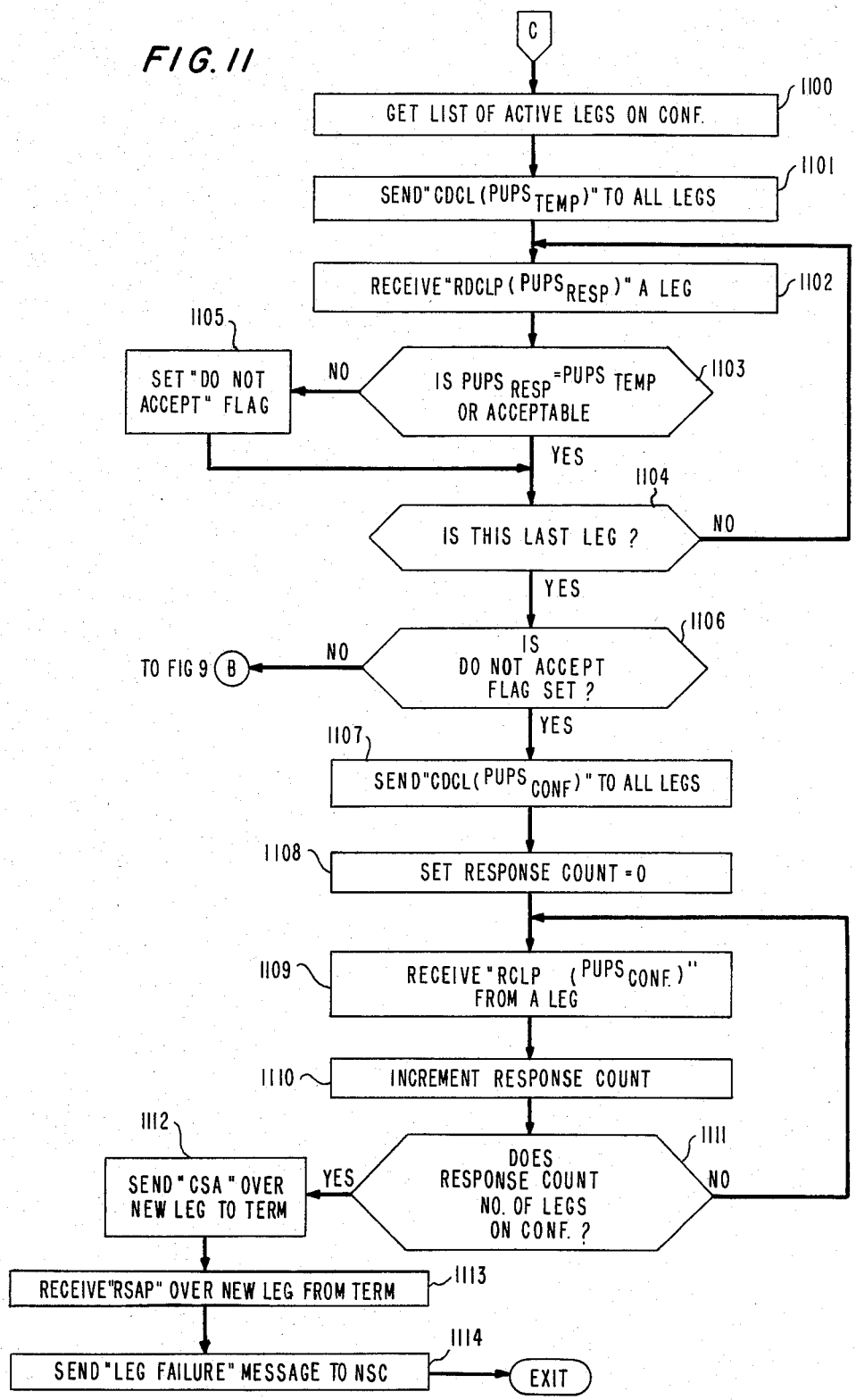

Turning now to FIG. 11, it can be seen that data bridge processor 200 gets a list of all active conferees on the conference (box 1100) and sends a CDCL message to all legs. This message contains a temporary set of private use parameters ($PUPS_{temp}$) used for interrogating each terminal to ascertain if the terminal is willing to engage in a session using the new set of parameters.

Each terminal will respond with an RDCL positive message and an indication of the private use parameters that it is willing to work with or a response indicating that the temporary set ($PUPS_{temp}$) is acceptable. This response message is shown in box 1102 and contains the private use parameters the leg being interrogated is willing to work with and designated herein as ($PUPS_{resp}$).

Data bridge processor 200 now compares the response ($PUPS_{resp}$) to the temporary private use parameters ($PUPS_{temp}$) and if they are the same or acceptable, the processor ascertains if all terminals have responded by executing box 1104 and continuing the process. If all terminals agree to work with the new set of private use parameters (designated $PUPS_{temp}$) the "yes" branch of box 1104 and the "no" branch of box 1106 are executed, and a "leg success" message is sent to processor 101.

Assuming that at least one terminal already connected to the conference refuses to engage in a session using the temporary set of private use parameters, the "no" branch of box 1103 would be executed, and data bridge processor 200 sets a "do not accept" flag in its memory. This function is set forth in box 1105.

In accordance with a feature of the invention, if any one of the data terminals on an existing conference does not agree to function with the private use parameters of the new leg that is about to be added, the new leg is rejected and the conference will continue as before under the original set of parameters.

Had the data bridge processor 200 gone through the list of data conferees and some of the data terminals had agreed to the new set of capabilities, but the new leg was not added to the conference due to at least one terminal not agreeing to work with the new set of capabilities, the data bridge processor must now go back to these terminals and reestablish the original set of private use parameters that was attributed to the conference before an attempt was made to add the new leg. This is accomplished by executing the process described in boxes 1107–1111. More specifically, when the new private use parameters were found unacceptable to at least one of the data terminals, a "do not accept" flag was set by processor 200. After all legs have responded and with the "do not accept" flag set, processor 200 sends a "command document capability list" message with the private use parameters of the conference, i.e., CDCL($PUPS_{conf}$), to all legs as shown in box 1107. At this time processor 200 also sets a response count register to zero in preparation for recording the number of responses received from the legs. As each response, acknowledging that the terminal will function with the conference parameters ($PUPS_{conf}$), is received, (box 1109) the register is incremented (box 1110) until all legs have responded (box 1111).

When all the existing terminals on the bridge have been returned to the original private use parameters, a "command session abort" message is sent to the new leg which, in turn, responds with a positive reply (boxes 1112 and 1113) and a "leg failure" message is sent by data bridge processor 200 to NSC processor 101 (box 1114). The NSC processor now orders the data store to play an announcement to the conference originator to indicate that the new leg has not been connected to the conference.

With all legs connected to the bridge, the data terminals served by these legs can now exchange documents, i.e., conference data. When a terminal has data to send, it will issue a "response session user information" (RSUI) message with a bit set to indicate it wishes to become a sender. Recognizing this message, processor 200 examines a queue to ascertain if any other data terminals have requested permission to send. If another terminal is sending or terminals are waiting to send, the new leg requesting to send is added to the queue to wait its turn. If no other terminals are requesting to send, processor 200 orders a "command session change control" (CSCC) message sent to the terminal that requested permission to send.

The data terminal acknowledges the change in control by responding with a message designated "response session change control positive" (RSCCP). The terminal can then establish the level six protocol by transmitting a "command document start" (CDS) message to the data bridge.

When the data terminal finishes sending conference data to the bridge, it relinquishes control back to the bridge by sending a CSCC message to the bridge which once again assumes control as primary sender for the conference.

Conference data received by a port circuit, such as port 202, is temporarily stored in the shared buffer memory 203 and, as noted above, port 202 informs the main processor that data has been received and stored in memory.

Processor 200 now orders each port circuit associated with the conference to read the contents of this memory location and transmit the data stored therein to the customer's data terminal.

Processor 200 now waits for a response from all ports, before informing the sender that the document has been sent to the other data terminal conferees. Upon receiving a response from any terminal, the processor ascertains from the port record in memory if a response had been received priorly. If a response had already been received, a port recovery procedure is implemented to remove this port from the conference and decrement the number of receivers for that conference.

If the port had not received a prior response from the customer's data terminal, processor 200 ascertains if a positive response, negative response or "document rejected" message has been received.

When a positive response is received from a terminal, the port response flag is set in memory and the response count register is incremented. The register count is then compared with the number of receivers on the conference and when all receivers have responded in a positive manner, a positive response message, "response document end positive" (RDEP), is sent to the sender who originated the document.

Had one of the ports received a negative response (RDPBN) from its data terminal, the conference error flag would have been set along with the response flag for that port. Under these circumstances, when all ports have received a response and with the error flag set, the data bridge would send a negative response to the original sender indicating that at least one conferee did not receive the document that was transmitted.

Figure 12:
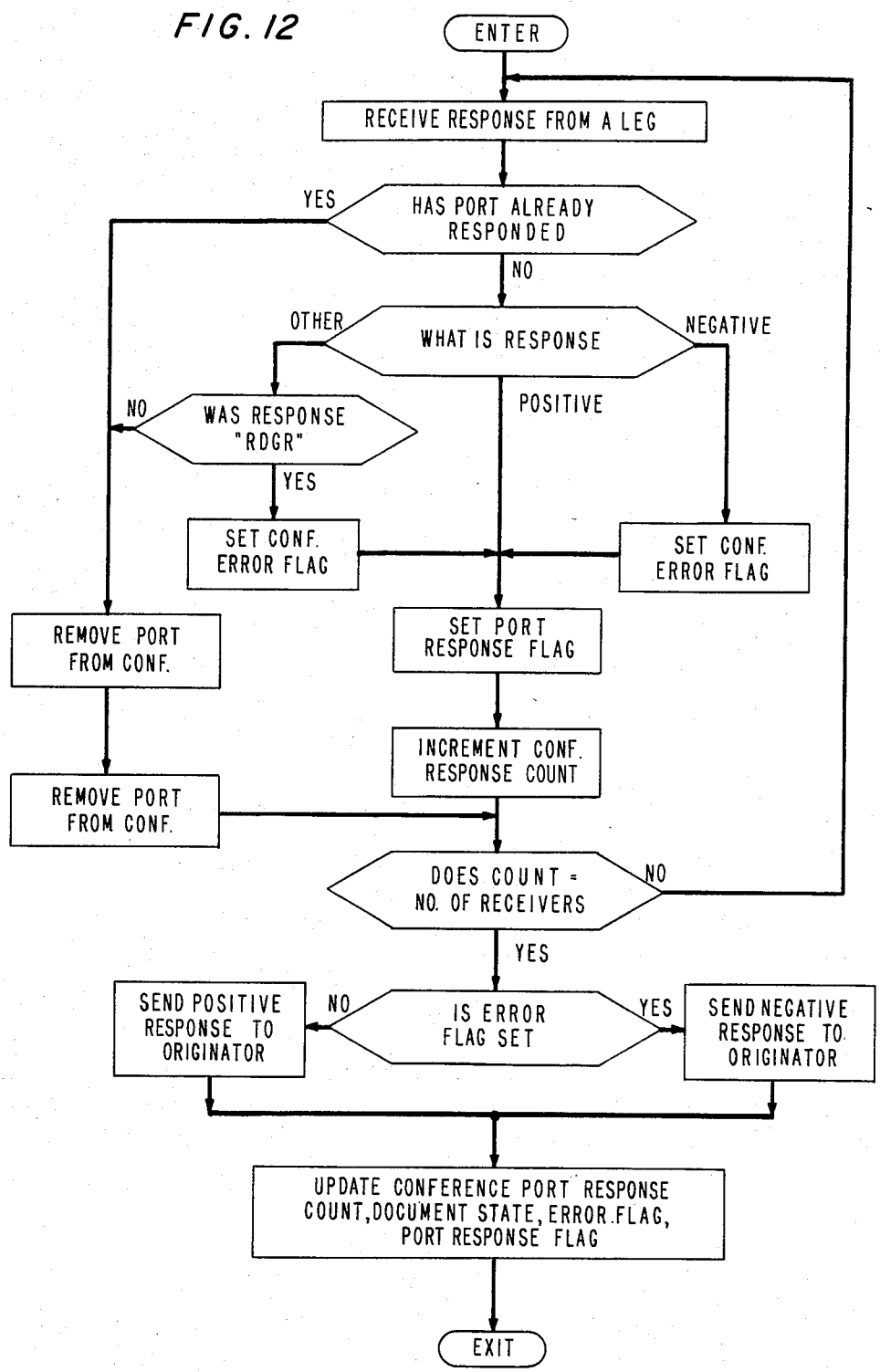
FIG. 12 shows a flow diagram depicting the sequence of operations for receiving and acknowledging responses from conferees upon the transmission of data over the conference bridge to each conferee.

Instead of receiving a positive or negative response from a port, a port might respond with a "response document general reject" (RDGR) message. At this point the error flag is set and the port response flag is set. The RDGR message indicates that an error has occurred with the data terminal that requires resynchronization and a negative response is returned to the original sender. A flow chart of the above described sequence of events relating to acknowledging the receipt of conference data by the data conferees is shown in FIG. 12.

In summary, an arrangement has been disclosed for providing conference facilities for data terminals wherein the data terminals may have different capabilities. Methods are disclosed for negotiating a common set of communication parameters that can be utilized on the conference.

In addition, methods are disclosed for reporting to the originator of a document transmission whether or not all conferees have received the document.

Of course, it will be understood that the arrangement described in the foregoing is merely illustrative of the application of the principles of the present invention. Numerous other arrangements may be utilized by those skilled in the art without departing from the spirit and scope of the invention.

What is claimed is:

1. For use in an arrangement for conferencing a plurality of data terminals via a conference bridge, a method for establishing a set of communication parameters for each of a plurality of data terminals engaged in a conference comprising the steps of:
   ascertaining a first set of parameters of a first data terminal connected to the bridge,
   assigning to the bridge said first set of parameters,
   informing a second data terminal requesting connection to the bridge of the parameters assigned to the bridge,
   ascertaining a second set of parameters assigned to said second data terminal,
   comparing the second set of parameters with the parameters assigned to the bridge,
   altering the parameters assigned to the bridge to conform to said second set upon concurrence of said first data terminal and,
   connecting said second data terminal to the bridge when said assigned parameters have been altered.

2. The invention set forth in claim 1 wherein the step of altering the bridge parameters comprises the step of inquiring whether said first data terminal can function with said second set of parameters.

3. For use in an arrangement for conferencing a plurality of data terminals via a conference bridge, a method for establishing a conference comprising the steps of:
   ascertaining a first set of parameters of a first data terminal connected to the bridge,
   assigning to the bridge said first set of parameters,
   ascertaining a second set of parameters associated with a second data terminal in response to a request for connection of said second data terminal to said bridge,
   comparing said second set of parameters with the parameters assigned to said bridge,
   ascertaining that said first data terminal will accept said second set of parameters when said second set of parameters differs from the parameters assigned to the bridge,
   changing the parameters assigned to the bridge to said second set, and
   connecting the second data terminal to the bridge upon changing the parameters assigned thereto.

4. For use in an arrangement for conferencing a plurality of data terminals having different communication parameters via a conference bridge, a method of adding a data terminal to an existing conference serving a plurality of data terminals comprising the steps of:
   ascertaining the communication parameter associated with the new data terminal to be added to the bridge,
   comparing the communication parameter of the new data terminal with the communication parameter assigned to the conference by the existing data terminals on the bridge,
   interrogating the existing data terminals to ascertain if the existing data terminals will accept the parameter of the new data terminal when the new data terminal's parameter differs from the parameter assigned to the conference, and
   connecting the new data terminal to the bridge only when all data terminals existing on the bridge accept the communication parameter of the new terminal.

5. The invention defined in claim 4 wherein the step of interrogating the existing data terminals comprises the steps of:
   transmitting the identity of the communication parameter of the new data terminal to all existing data terminals on the bridge and,
   receiving a response from each existing data terminal as to whether the existing data terminal will accept the communication parameter of the new data terminal.

6. The invention defined in claim 4
further including the step of assigning to the conference bridge a new communication parameter corresponding to the communication parameter of the new leg when the new leg is connected to the bridge.

7. For use in a customer controlled arrangement for conferencing via a conference bridge a plurality of data terminals having different capabilities, a method for controlling the addition of a new data terminal to an existing conference comprising the steps of:

ascertaining the conferences capability of a new data terminal about to be added to an existing conference;

comparing the ascertained capability with the former capability common to all data terminals already coupled to the conference;

transmitting to each coupled data terminal for acceptance thereat, an indication of the new capability, in the event the new capability differs from the former capability common to the data terminals coupled to the conference;

upon rejection of the new capability by any one of the data terminals coupled to the conference, transmitting an indication of the former capability to all data terminals coupled to the conference; and blocking the coupling of the new data terminal to the conference.

8. The invention defined in claim 7
further comprising the step of informing the customer controlling the conference whether the new data terminal was coupled to the conference.

9. The invention defined in claim 7
further comprising the step of receiving a response from each data terminal coupled to the conference that the indication of the former capability has been received by the terminal.

* * * * *